US011160008B2

(12) United States Patent
Sugaya et al.

(10) Patent No.: US 11,160,008 B2
(45) Date of Patent: Oct. 26, 2021

(54) COMMUNICATION DEVICE AND COMMUNICATION METHOD

(71) Applicant: SONY CORPORATION, Tokyo (JP)

(72) Inventors: Shigeru Sugaya, Kanagawa (JP); Yusuke Tanaka, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/329,357

(22) PCT Filed: Aug. 1, 2017

(86) PCT No.: PCT/JP2017/027879
§ 371 (c)(1),
(2) Date: Feb. 28, 2019

(87) PCT Pub. No.: WO2018/078994
PCT Pub. Date: May 3, 2018

(65) Prior Publication Data
US 2019/0268826 A1 Aug. 29, 2019

(30) Foreign Application Priority Data
Oct. 24, 2016 (JP) .............................. JP2016-208178

(51) Int. Cl.
H04W 4/00 (2018.01)
H04W 48/08 (2009.01)
H04W 74/08 (2009.01)
H04W 84/12 (2009.01)

(52) U.S. Cl.
CPC ........... H04W 48/08 (2013.01); H04W 74/08 (2013.01); H04W 84/12 (2013.01)

(58) Field of Classification Search
None
See application file for complete search history.

(56) References Cited

U.S. PATENT DOCUMENTS 9,942,193 B1* 4/2018 Chu ...................... H04W 84/12
2008/0298333 A1 12/2008 Seok
2012/0218982 A1 8/2012 Lee et al.
2014/0328193 A1 11/2014 Horn et al.
(Continued)

FOREIGN PATENT DOCUMENTS

BR 112016025453 A2 8/2017
CN 1852192 A 10/2006
(Continued)

OTHER PUBLICATIONS

International Search Report and Written Opinion of PCT Application No. PCT/JP2017/027879, dated Oct. 24, 2017, 08 pages of ISRWO.

(Continued)

Primary Examiner — Zewdu A Beyen
(74) Attorney, Agent, or Firm — Chip Law Group

(57) ABSTRACT

An AP notifies of BSS Color information of its own device together with information for specifying the BSS Color information to be managed. Upon receiving the notification, an STA identifies BSS Color information used in the same ESS and BSS Color information used in an OBSS not belonging to the ESS, and deals with signals from other BSSs in the same ESS, in accordance with signals from the BSS of its own device.

8 Claims, 12 Drawing Sheets

(56) References Cited

U.S. PATENT DOCUMENTS

| | | |
|---|---|---|
| 2015/0282043 A1 | 10/2015 | Fang et al. |
| 2016/0242210 A1 | 8/2016 | Seok |
| 2017/0041952 A1 | 2/2017 | Kim et al. |
| 2017/0255659 A1* | 9/2017 | Cariou ............... H04B 7/0413 |
| 2018/0098378 A1* | 4/2018 | Patil ...................... H04W 88/10 |
| 2018/0184285 A1* | 6/2018 | Patil .................... H04L 61/2038 |
| 2019/0029038 A1 | 1/2019 | Kim et al. |

FOREIGN PATENT DOCUMENTS

| | | | |
|---|---|---|---|
| CN | 101572935 A | | 11/2009 |
| CN | 103313242 A | | 9/2013 |
| CN | 104718778 A | | 6/2015 |
| CN | 104954297 A | | 9/2015 |
| CN | 105594288 A | | 5/2016 |
| CN | 106465423 A | | 2/2017 |
| EP | 3054736 A1 | | 8/2016 |
| EP | 3139690 A1 | | 3/2017 |
| JP | 2016-039515 A | | 3/2016 |
| JP | 2016-163178 A | | 9/2016 |
| JP | 2017-514423 A | | 6/2017 |
| JP | 6259102 B2 | | 1/2018 |
| JP | 6321283 B2 | | 5/2018 |
| KR | 10-2016-0074518 A | | 6/2016 |
| KR | 10-2016-0135746 A | | 11/2016 |
| MX | 362025 B | | 1/2019 |
| RU | 2536858 C2 | | 12/2014 |
| TW | I411251 B | | 10/2013 |
| WO | 2012/002705 A2 | | 1/2012 |
| WO | 2015/050311 A1 | | 4/2015 |
| WO | 2015/167290 A1 | | 11/2015 |
| WO | 2016/144902 A1 | | 9/2016 |

OTHER PUBLICATIONS

Omar, et al., "A Survey on High Efficiency Wireless local Area Networks: Next Generation WiFi", IEEE Communication Surveys and Tutorials, vol. 18, Issue 4, Apr. 14, 2016, pp. 2315-2344.

Omar, et al., "A Survey on High Efficiency Wireless local Area Networks: Next Generation WiFi", IEEE Communication Surveys and Tutorials, vol. 18, No. 4, Apr. 14, 2016, pp. 2315-2344.

Extended European Search Report of EP Application No. 17863349.1, dated Sep. 12, 2019, 09 pages.

Omar, et al., "A Survey on High Efficiency Wireless Local Area Networks: Next Generation WiFi", IEEE Communication Surveys and Tutorials, vol. 18, No. 4, Fourth Quarter 2016, 2315-2344 pages.

Search Reports for SG Patent Application No. 11201901974Q, dated May 2, 2020, 09 pages.

Office Action for Russian Application No. 2019111608 dated Jul. 28, 2020.

Office Action for CN Patent Application No. 201780064003.3, dated Mar. 2, 2021, 07 pages of English Translation and 05 pages of Office Action.

Office Action for TW Patent Application No. 106135098, dated Feb. 2, 2021, 21 pages of Office Action.

* cited by examiner

|         | ESSID    | BSS Color      | ESS Color Mask | ESS BSS Color      |
|---------|----------|----------------|----------------|--------------------|
| FIG. 3A | Same ESS | 0x02 : 00 0010 | 00 0001        | 0x03               |
| FIG. 3B | Same ESS | 0x04 : 00 0100 | 00 0011        | 0x05 ~ 0x07        |
| FIG. 3C | Same ESS | 0x09 : 00 1000 | 00 0111        | 0x08, 0x0A ~ 0x0F  |
| FIG. 3D | Same ESS | 0x07 : 00 0111 | 00 0010        | 0x05               |
| FIG. 3E | Same ESS | 0x0A : 00 1010 | 00 0110        | 0x08, 0x0C, 0x0E   |
| FIG. 3F | Same ESS | 0x01 : 00 0001 | 00 1010        | 0x03, 0x09, 0x0B   |

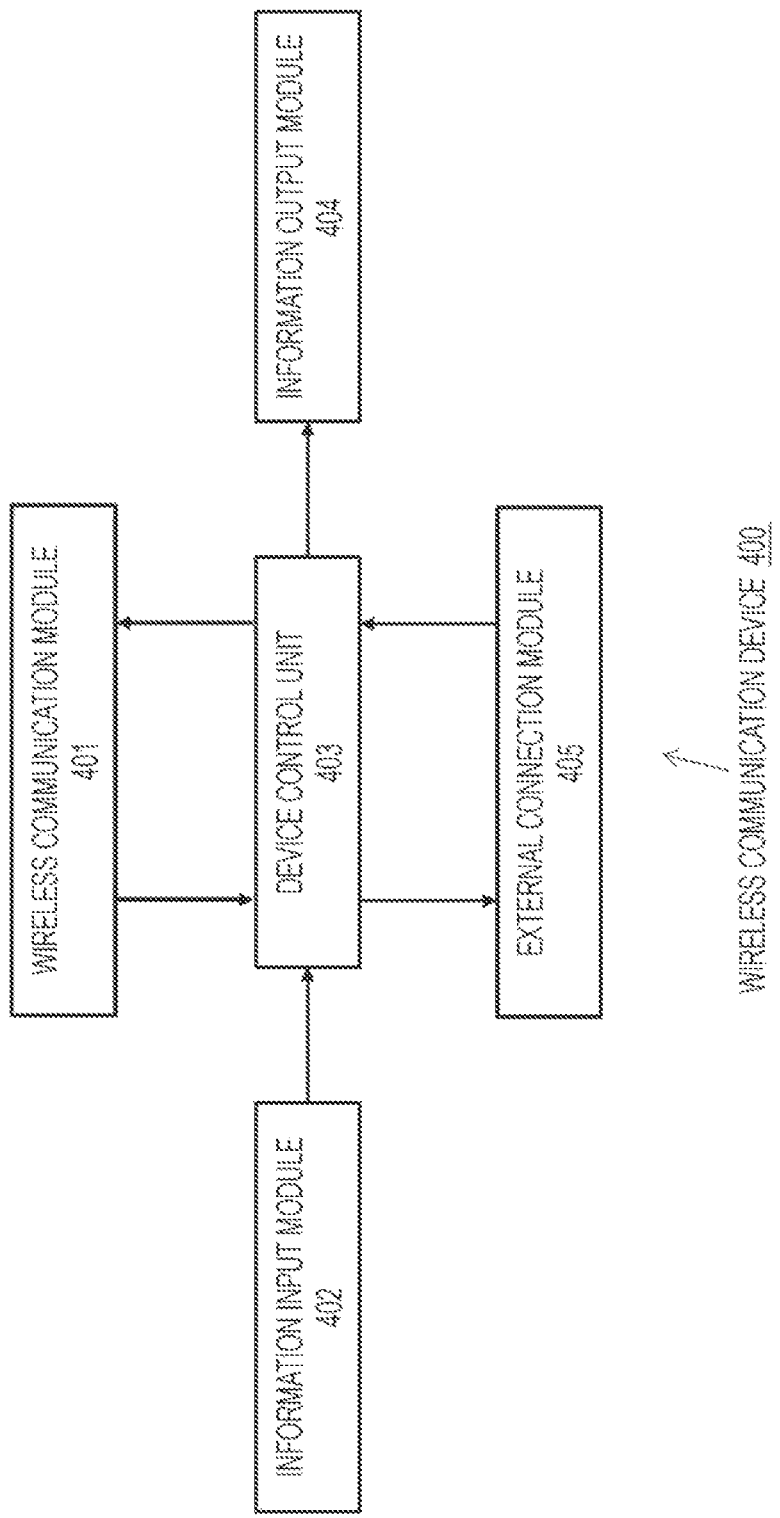

FIG. 9

| Element ID | Length | BSS Color | BSSID | ESS Color Mask | ESSID | ESS Parameter | ... |

Extended Service Set Color Information Element

COMMUNICATION DEVICE AND COMMUNICATION METHOD

CROSS REFERENCE TO RELATED APPLICATIONS

This application is a U.S. National Phase of International Patent Application No. PCT/JP2017/027879 filed on Aug. 1, 2017, which claims priority benefit of Japanese Patent Application No. JP 2016-208178 filed in the Japan Patent Office on Oct. 24, 2016. Each of the above-referenced applications is hereby incorporated herein by reference in its entirety.

TECHNICAL FIELD

The technology disclosed in this specification relates to a communication device and a communication method which are capable of performing an operation with a basic service set belonging to an extended service set.

BACKGROUND ART

In an infrastructure mode of a wireless LAN represented by IEEE 802.11 and the like, a basic service set (BSS) is configured with one access point (AP) and one or more client terminals (STA) subordinate thereto, and further an upper-level extended service set (ESS) including a plurality of BSSs is configured. The BSS is identified by a 48-bit network identifier called a BSSID, and a normal BSSID is identical to a MAC address of an AP. Further, a maximum of 32 alphanumeric characters can be set as a network identifier ESSID identifying an ESS, but it is necessary to set the same ESSID in each of devices (the AP and the STA) constituting an ESS.

For example, a technique in which, in a network system including a plurality of groups in which mutually different ESSIDs are set and a relay device connected to the APs of each group, the relay device controls a change in the ESSID for the relay devices of other associated groups has been proposed (for example, see Patent Document 1).

CITATION LIST

Patent Document

Patent Document 1: Japanese Patent Application Laid-Open No. 2016-39515

SUMMARY OF THE INVENTION

Problems to be Solved by the Invention

It is an object of the technology disclosed in this specification to provide an excellent communication device and communication method which are capable of performing an operation suitably with the basic service set belonging to the extended service set.

Solutions to Problems

The technology disclosed in this specification is made in light of the above problem, and a first aspect of the technology disclosed in this specification provides a communication device that notifies of first information identifying a BSS of the communication device and second information capable of specifying another BSS included in the same ESS.

According to a second aspect of the technology disclosed in this specification, the communication device according to the first aspect is configured to notify of BSS Color information of the communication device as the first information and notify of the second information capable of specifying the BSS Color information set in another access point included in the same ESS.

According to a third aspect of the technology disclosed in this specification, the communication device according to the second aspect is configured to notify the second information capable of specifying the BSS Color information set in another access point included in the same ESS on the basis of the BSS Color information of the communication device.

According to a fourth aspect of the technology disclosed in this specification, the communication device according to the second aspect is configured to notify of ESS Color mask information expressing the BSS Color information of another access point set in the same ESS by a format of a bit mask for a bitmap indicating the BSS Color information of the communication device as the second information.

According to a fifth aspect of the technology disclosed in this specification, the communication device according to the first aspect is configured to store the first information and the second information in a physical header and notify of the first information and the second information.

According to a sixth aspect of the technology disclosed in this specification, the communication device according to the first aspect is configured to store the second information in an information element included in a predetermined frame and notify of the second information.

Further, a seventh aspect of the technology disclosed in this specification provides a communication method includes a step of notifying of first information identifying a BSS of an own device and second information capable of specifying another BSS included in the same ESS.

Further, an eighth aspect of the technology disclosed in this specification provides a communication device that manages first information identifying a BSS of the communication device and second information capable of specifying another BSS included in the same ESS, and identifies whether a reception signal is a signal of the same ESS or a signal from another ESS, using the second information.

According to a ninth aspect of the technology disclosed in this specification, first information is BSS Color information, and second information is information capable of specifying the BSS Color information set in another access point included in the same ESS, and the communication device according to the eighth aspect is configured to identify the reception signal including the first information on the basis of the BSS Color information specified using the second information.

According to a tenth aspect of the technology disclosed in this specification, the second information is information capable of specifying the BSS Color information set in another access point included in the same ESS on the basis of the BSS Color information, and the communication device according to the ninth aspect is configured to identify the reception signal including the first information on the basis of the BSS Color information specified from the first information using the second information.

According to an eleventh aspect of the technology disclosed in this specification, in the communication device according to the ninth aspect, the second information is ESS Color mask information expressing the BSS Color information of another access point set in the same ESS by a format of a bit mask for a bitmap indicating the BSS Color information of the communication device.

According to a twelfth aspect of the technology disclosed in this specification, the communication device according to the eighth aspect is configured to receive a signal in which the first information and the second information are stored in a physical header.

According to a thirteenth aspect of the technology disclosed in this specification, the communication device according to the eighth aspect is configured to receive a predetermined frame including an information element storing the second information.

According to a fourteenth aspect of the technology disclosed in this specification, the communication device according to the eighth aspect is configured to deal with the reception signal identified as the same ESS, in accordance with a signal of the BSS of the communication device.

According to a fifteenth aspect of the technology disclosed in this specification, the communication device according to the eighth aspect is configured to identify the reception signal in accordance with whether or not the first information included in the reception signal is able to be identified from the second information to be managed.

According to a sixteenth aspect of the technology disclosed in this specification, the communication device according to the eighth aspect is configured to identify the reception signal in accordance with whether or not the first information to be managed is able to be identified from the second information included in the reception signal.

According to a seventeenth aspect of the technology disclosed in this specification, the communication device according to the eighth aspect is configured to deal with the frame not to be received in accordance with a received field strength of the reception signal identified as another ESS.

Further, an eighteenth aspect of the technology disclosed in this specification provides a communication method, including:

a step of managing first information identifying a BSS of an own device and second information capable of specifying another BSS included in the same ESS; and a step of identifying whether a reception signal is a signal of the same ESS or a signal from another ESS, using the second information.

Effects of the Invention

According to the technology disclosed in this specification, it is possible to provide an excellent communication device and communication method which are capable of performing an operation suitably with the basic service set belonging to the extended service set.

Further, the effect described in this specification is merely an example, and the effect of the present invention is not limited thereto. Further, the present invention may further have an additional effect in addition to the above effect.

Still other objects, features, and advantages of the technology disclosed in this specification will become apparent from detailed description based on an embodiment to be described later or the appended drawings.

BRIEF DESCRIPTION OF DRAWINGS

FIGS. 3A, 3B, 3C, 3D, 3E, and 3F are diagrams illustrating a setting status of BSS Color information and ESS Color mask information.

FIG. 4 is a diagram illustrating a configuration example of a wireless communication device 400.

FIG. 9 is a diagram illustrating a configuration example of an extended service set color information element.

MODE FOR CARRYING OUT THE INVENTION

Figures 1, 2:
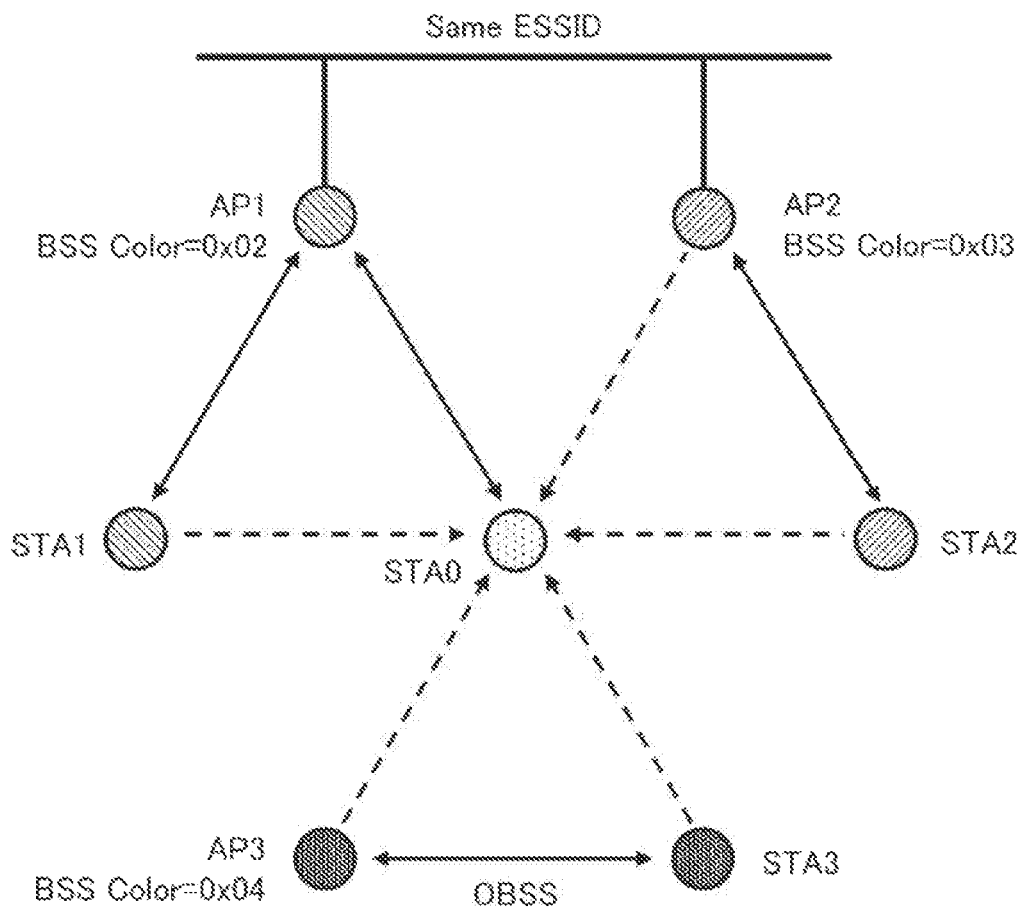
FIG. 1 is a diagram illustrating a configuration example of a wireless LAN network.
FIG. 2 is a diagram illustrating an example of a setting status of parameters of each access point in the network configuration example illustrated in FIG. 1.

Hereinafter, an embodiment of the technology disclosed in this specification will be described in detail with reference to the appended drawings.

In the latest wireless LAN standardization work of IEEE 802.11ax, a technique of adding BSS Color information to a physical layer convergence protocol (PLCP) header serving as a physical header as identification information of the BSS has been proposed. According to this technique, even if a reception side does not decode all frames, the reception side can detect whether a signal is a signal of a BSS to which its own device belongs (hereinafter, also referred to as "its own device BSS") or a signal from another BSS overlapping (hereinafter, also referred to as "overlapping BSS (OBSS)") by decoding a head portion.

Here, the BSS Color information is information identifying each BSS in an upper-level ESS including the BSS to which its own device belongs. As the identification information of the BSS, there is also a BSSID stored in a MAC header. The BSSID is usually identical to the MAC address of the AP and is an identifier having a 48-bit length (described above). On the other hand, the BSS Color information has a simpler form than the BSSID and is, for example, short information having a 6-bit length. In other words, the BSS Color information is different from the BSSID of the related art in that it has a simplified format, and it is stored in a physical header (not a physical payload). Further, there are various information generation methods such as a method in which the AP sets a value not overlapping with another BSS in the ESS as the BSS Color information of the BSS of its own device, a method of allocating the BSS Color information of each BSS included in the ESS by a server managing the ESS, or the like.

In particular, in the standardization work described above, a technique of accommodating more wireless communication devices on the same frequency channel by restricting a radio coverage of the BSS with transmission power control has been disclosed.

Further, in the standardization work described above, an access procedure of performing control such that, in a case where transmission power of a signal transmitted from a device is controlled, a transmission operation of its own device BSS is not affected by a signal from the OBSS by making a difference in a setting of a received field strength for detecting the presence of the signal or making a difference in a detection level between a signal of its own device BSS and a signal from the OBSS is also under review. Specifically, a threshold value of the received field strength of the signal from the OBSS is set to be higher than a threshold value of the signal of its own device BSS so that the device in the BSS easily obtains a transmission access authority without being disturbed by the signal from the OBSS, thereby improving communication efficiency.

In the ESS of the related art, the same ESSID (SSID) is allocated to different APs, and it functions as one wireless network by receiving signals coming from these APs (described above).

Within a predetermined ESS, a network operation method in which a cooperative operation is performed between the BSSs is considered as well. When the cooperative operation is performed in the ESS, it is also necessary to deal with the signal from the OBSS in the same ESS in accordance with the signal of the BSS of its own device. Therefore, the applicant of this application believes that it is necessary to identify whether or not a signal which is not the BSS of its own device is a signal from within the same ESS or a signal from the OBSS not belonging to the same ESS.

If the BSS Color information is applied to the ESS, frames in which different types of BSS Color information are set are transmitted from AP belonging to the same ESS. For this reason, the receiving STA side is unable to immediately detect that a signal is a signal transmitted from an AP belonging to a desired ESS simply by decoding the BSS Color information in the head. In other words, with the BSS Color information, it is possible to identify whether or not it is a signal of its own device BSS, but it is unable to identify whether or not it is a signal from a BSS of a desired ESS.

Accordingly, when the STA detects signals with different types of BSS Color information, the STA recognizes all of them as the signals from the OBSS. Further, in a case where the received field strength of the signal is a predetermined value or less, the STA determines that transmission of its own device is possible, and thus signals within a desired ESS are likely to collide with each other. Further, if the access procedure (described above) of making a difference in the detection level between the signal of its own device BSS and the signal from the OBSS is applied, the number of cases in which signals from the OBSS in the same ESS are not received increases, and thus signals within a desired ESS are more likely to collide with each other.

According to the method of setting the same BSS Color information in all the APs belonging to the same ESS and performing communication, it is possible to identify whether or not the signal is the signal from the BSS of the desired ESS simply by decoding a PLCP header. However, although it is possible to immediately detect the signal from the OBSS not belonging to the same ESS, it is unable to directly separate signals from other APs belonging to the same ESS as the signal from the desired AP. In other words, in this method, since signals from other APs belonging to the same ESS are also the same BSS Color information, there is a problem that it is necessary for the STA to perform a decoding process on all the frames in order to determine whether or not the signal is the signal of its own device BSS, and thus unnecessary data are received.

Further, in the network system (for example, see Patent Document 1) in which the relay device controls the change in the ESSID for relay devices of other associated groups, the group of the AP or the relay device is managed in accordance with the ESSID, but it is considered that BSS identification information added to individual APs is unable to be managed. Further, as the ESSID is changed, there is a concern that parameters associated with the AP or the relay device are likely to be reset.

In this regard, in this specification, technology of notifying of information identifying the BSS Color information of other APs set in the same ESS together with the BSS Color information set in the AP (or for each BSS) so that the STA is able to detect signals from other APs belonging to the same ESS is proposed.

The information identifying the BSS Color information of other APs set in the same ESS is information capable of specifying the BSS Color information of other APs set in the same ESS on the basis of the BSS Color information of its own device. Specifically, "ESS Color mask information" expressed as a mask for the BSS Color information of its own device (specifically, a bit mask for the BSS Color information indicated in a bitmap format) is notified of from the AP to the STA together with the BSS Color information of its own device. Further, the STA side detects the BSS Color information of other APs set in the same ESS from the BSS Color information of its own device and the ESS Color mask information for a value thereof by decoding, for example, a physical header portion of a reception frame.

According to the technology disclosed in this specification, the information which can be detected together with the BSS Color information used in other APs belonging to the ESS is notified of together with the BSS Color information of its own device, and thus the reception side can distinguish signals from other BSS belonging to the same ESS and signals from the OBSS not belonging to the same ESS.

Further, according to the technology disclosed in this specification, the AP notifies of the BSS Color information of its own device and the ESS Color mask information together, and thus it is possible to notify of the BSS Color information to be managed without notifying of the bitmaps of all pieces of BSS Color information. The ESS Color mask information is information having the same bit length as the BSS Color information and expressing the BSS Color information of other APs set in the same ESS as a bit mask for the BSS Color information of its own device indicated in the bitmap format. In other words, a plurality of pieces of BSS Color information can be designated even in short information having the same bit length as the BSS Color information. Therefore, according to the technology disclosed in this specification, there is also an advantage in that the AP can notify of all pieces of BSS Color information to be managed with short information. Further, the STA side can easily identify the BSS Color information used in the ESS and the BSS Color information used in the OBSS not belonging to the ESS on the basis of the BSS Color information of the AP of its own device and the ESS Color mask information.

FIG. 1 illustrates a configuration example of a wireless LAN network to which the technology disclosed in this specification is applied.

In FIG. 1, an access point 1 (AP 1) and an access point 2 (AP 2) in which the same ESSID is set are connected via, for example, an Ethernet (registered trademark) cable or the like and operate in cooperation with each other.

A client terminal 0 (STA 0) and a client terminal 1 (STA 1) are connected to the AP 1. Further, the BSS Color information=0x02 is set in the AP 1. A client terminal 2 (STA 2) is connected to the other AP 2, and the BSS Color information=0x03 is set in the AP 2.

On the other hand, an access point 3 (AP 3) is located in the neighborhood in a state it is not connected as the same ESS as the AP 1 and the AP 2. A client terminal 3 (STA 3) is connected to the AP 3, and the BSS Color information=0x04 is set in the AP 3.

Further, FIG. 2 illustrates a list of setting statuses of the BSS Color information and the ESSID as an example of setting statuses of parameters of the access points AP 1 to AP 3 in the network configuration example illustrated in FIG. 1.

The AP 1 operates as a first BSS in a state in which the BSS Color information is set to 0x02, and the AP 2 having the same ESSID is located adjacent to the AP 1.

Further, the AP 2 operates as a second BSS in a state in which the BSS Color information is set to 0x03, and the AP 1 having the same ESSID is located adjacent to the AP 2.

Further, the AP 3 operates as a third BSS in a state in which the BSS Color information is set to 0x004. Here, the AP 3 is not set as the ESS (that is, no ESS).

In the latest wireless LAN standardization work of IEEE 802.11ax, a technique of adding the BSS Color information to the PLCP header has been proposed. The BSS Color information is short information having a 6-bit length for identifying each BSS in the upper-level ESS including the BSS to which its own device belongs and is set to a value not overlapping with other BSSs in the ESS.

Here, it is assumed that, in addition to the STA 1 connected to the same BSS, the STA 0 is able to receive signals from the AP 2 and the STA 2 connected and operating as the same ESS and signals from the AP 3 and the STA 3 not connected as the same ESS.

In the configuration of the related art, the STA 0 receives signals from the AP 1 and the STA 1, which are the same BSS Color information, but regards signals from the AP 2 and the SAT 2 of other the BSS Color information as the signals from the OBSS and does not receive them although it is connected as the same ESS. Further, even in a case where the STA 0 receives signals from the AP 3 and the STA 3 that are not connected as the same ESS, since the BSS Color information is not the same, the STA 0 processes them as the signals from the OBSS.

Further, in the access control procedure of the related art, even in a case where the signal from the OBSS is detected, if the received signal strength has a level of a predetermined threshold value or less, the STA can perform transmission from its own device without receiving the signal. Further, when the signal from the OBSS is detected, the STA may set a threshold value so as to facilitate transmission from its own device.

For this reason, there is a problem in that the STA 0 deals the signals from the AP 2 and the STA 2 belonging to the same ESS as the signals from the OBSS, and if the signal has a predetermined received field strength or less, the STA 0 starts transmitting from its own device toward the AP 1.

In a case where the network operation method in which the cooperative operation is performed between the BSSs within a predetermined ESS is considered, it is necessary for the STA 0 to deal with the signals from the AP 2 and the STA 2 belonging to the same ESS in accordance with the signal of its own device BSS.

In the signals from the AP 1 and the STA 1, the BSS Color information=0x02 set in the AP 1 is stored in the PLCP header, while in the signals from the AP 2 and the STA 2, the BSS Color information=0x03 set in the AP 2 is stored in the PLCP header. The STA 0 is unable to identify whether or not it is the signal from the BSS belonging to the same ESS simply by checking the BSS Color information of the signal from the AP 2 or the STA 2.

On the other hand, in the present embodiment, the AP 1 notifies each STA subordinate thereto of the ESS Color mask information from which the BSS Color information used by other (all) APs belonging to the ESS can be detected on the basis of the BSS Color information of its own device. Therefore, the STA 0 easily identifies that the BSS Color information=0x03 of the signal from the AP 2 or the STA 2 is the BSS Color information used in the same ESS on the basis of the BSS Color information of its own device and the ESS Color mask information.

FIGS. 3A, 3B, 3C, 3D, 3E, and 3F illustrate setting statuses of the BSS Color information and ESS Color mask information (ESS Color Mask) in a case where the technology disclosed in this specification is applied. Here, parameters notified of from the AP 1 to each STA of the STA 0 and the STA 1 in the network configuration example illustrated in FIG. 1 are illustrated.

The ESS Color mask information is information capable of specifying the BSS Color information of all the other APs set in the same ESS on the basis of the BSS Color information of its own device. Specifically, the ESS Color mask information is information expressing the BSS Color information of all the other APs set in the same ESS in a bit mask format for the bitmap indicating the BSS Color information of its own device. Therefore, each STA can specify all pieces of BSS Color information used in the ESS from the BSS Color information of its own device and the ESS Color mask information notified of from the AP. Further, the ESS Color mask information is short information having the same bit length as the BSS Color information, but it is possible to specify a plurality of pieces of BSS Color information with the bit mask format. Although the ESS Color mask information is not information indicating directly the "Color" of the ESS, it can be interpreted as indicating the "Color" of the ESS from a viewpoint that all pieces of BSS Color information in the ESS can be derived with the bit mask format.

Setting values illustrated in FIG. 3A indicate the network configuration illustrated in FIG. 1. If the BSS Color information:0x02 of the AP 1 is indicated by the bitmap format, it becomes 00 0010. If a least significant bit (LSB) is masked with the ESS Color mask information:00 0001 for the BSS Color information, it is derived that two bitmaps of 00 0010 and 00 0011 are the BSS Color information set in the same ESS. Among them, 00 0011, that is, 0x03 excluding the BSS Color information of the AP 1 itself can be specified as being the BSS Color information (ESS BSS Color) used in another access point the AP 2 of the same ESS.

Further, FIG. 3B illustrates other the BSS Color information in the same ESS specified by setting the ESS Color mask information:00 0011 for the BSS Color information: 0x04. The BSS Color information:0x04 indicated by the bitmap format is 00 0100. If lower 1 to 2 bits are masked with the ESS Color mask information:00 0011 for the BSS Color information, four types of bitmaps of 00 0100, 00 0101, 00 0110, and 00 0111 are derived as the BSS Color information set in the same ESS. Among them, 0x05 to 0x07 excluding the BSS Color information of its own device can be specified as being the BSS Color information used by other APs of the same ESS.

Further, FIG. 3C illustrates other the BSS Color information in the same ESS specified by setting the ESS Color mask information:00 0011 for the BSS Color information: 0x09. The BSS Color information:0x09 indicated by the bitmap format is 00 1001. If the lower 1 to 3 bits are masked with the ESS Color mask information:00 0111 for the BSS Color information, 8 types of bitmaps of 00 1000, 00 1001, 00 1010, 00 1011, 00 1100, 00 1101, 00 1110, and 00 1111 are derived as the BSS Color information set in the same ESS. Among them, 0x08 and 0x0A to 0x07F excluding the BSS Color information of its own device can be specified as being the BSS Color information used by other APs of the same ESS.

Further, FIG. 3D illustrates another the BSS Color information in the same ESS specified by setting the ESS Color mask information:00 0111 for the BSS Color information: 0x07. The BSS Color information:0x07 indicated by the bitmap format is 00 0111. If a lower second bit is masked with the ESS Color mask information:00 0010 for the BSS Color information, two kinds of bitmaps of 00 0101 and 00 0111 are derived as the BSS Color information set in the same ESS. Among them, 0x05 excluding the BSS Color information of its own device can be specified as being the BSS Color information used by other APs of the same ESS.

Further, FIG. 3E illustrates other the BSS Color information in the same ESS specified by setting the ESS Color mask information:00 0110 for the BSS Color information: 0x0A. The BSS Color information: 0x0A indicated by the bitmap format is 00 1010. If a lower third bit and a lower second bit are masked with the ESS Color mask information:00 0110 for the BSS Color information, four types of bitmaps of 00 1000, 00 1010, 00 1100, and 00 1110 are derived as the BSS Color information set in the same ESS. Among them, 0x08, 0x0C, and 0x0E excluding the BSS Color information of its own device can be specified as being the BSS Color information used by other APs of the same ESS.

Further, FIG. 3F illustrates other the BSS Color information in the same ESS specified by setting the ESS Color mask information:00 1010 for the BSS Color information: 0x01. The BSS Color information:0x01 indicated by the bitmap format is 00 0001. If a lower fourth bit and a lower second bit are masked with the ESS Color mask information:00 1010 for the BSS Color information, four types of bitmaps of 00 0001, 00 0011, 00 1001, and 00 1011 are derived as the BSS Color information set in the same ESS. Among them, 0x03, 0x09, and 0x0B excluding the BSS Color information of its own device can be specified as being the BSS Color information used by other APs of the same ESS.

It is sufficiently understood that a configuration capable of specifying various types of BSS Color information used in the same ESS with the setting of the mask bits of the ESS Color mask information is obtained. Further, it is also understood that a plurality of pieces of BSS Color information used in the same ESS can be specified by the short ESS Color mask information having the same bit length as the BSS Color information.

FIG. 4 illustrates a configuration example of a wireless communication device 400 to which the technology disclosed in this specification can be applied. The illustrated wireless communication device 400 can operate as an access point (AP) and a terminal (STA) in the wireless LAN network illustrated in FIG. 1.

The wireless communication device 400 includes a wireless communication module 401, an information input module 402, a device control unit 403, an information output module 404, and an external connection module 405.

The wireless communication module 401 has a function of implementing wireless communication in the wireless LAN network. The information input module 402 receives a manipulation of the user from a keyboard, a button input, or the like or operates as a microphone or a camera which acquires a voice or image data to be transmitted. The device control unit 403 controls the operation of the wireless communication device 400 in an integrated manner. The information output module 404 notifies the user of an operation state or the like and outputs received data to a speaker or a display so that the received data is displayed. The external connection module 405 establishes a connection to the Internet network, an external communication network or the like, for example, in a case where the wireless communication device 400 operates as the AP.

Further, in a case where the wireless communication device 400 is the AP that performs the cooperative operation between BSSs in the same ESS, the external connection module 405 is assumed to be configured to perform communication with other APs via a wired LAN such as Ethernet (registered trademark) so as to be able to exchange various types of parameters such as ESSID and the BSS Color information.

Further, the information input module 402 and the information output module 404 may have additional functions if necessary or may be configured to be substituted as information terminals such as personal computers, smart phones, keyboards, displays, or speakers. Further, the wireless communication device 400 may further include a functional module other than those illustrated in FIG. 4, but since it is not directly related to the technology disclosed in this specification, illustration and description thereof are omitted here.

Figure 5:
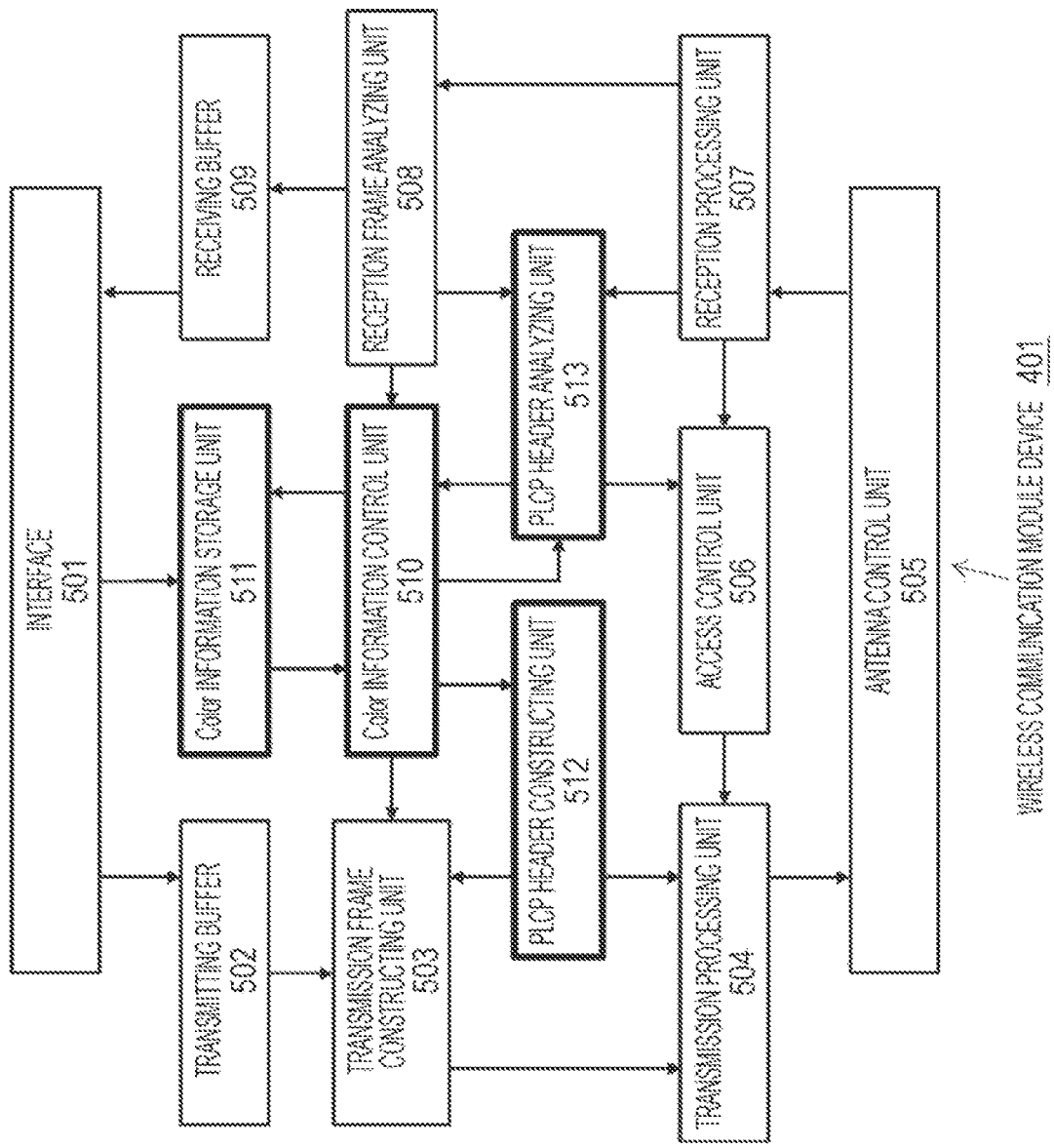
FIG. 5 is a diagram illustrating a specific configuration example of a wireless communication module 401.

FIG. 5 illustrates a specific configuration example of the wireless communication module 401 in FIG. 4. In the illustrated wireless communication module 401, respective units including an interface 501, a transmitting buffer 502, a transmission frame constructing unit 503, a transmission processing unit 504, an antenna control unit 505, an access control unit 506, a reception processing unit 507, a reception frame analyzing unit 508, and a receiving buffer 509 implements a communication operation in a common wireless LAN network.

The interface 501 receives data such as voice or an image transmitted from an upper-level application in a device equipped with the wireless communication device 400 and delivers received data such as voice or an image to the application in the device. The transmitting buffer 502 stores the data acquired from the upper-level application via the interface 501. The transmission frame constructing unit 503 converts transmission data into data having a predetermined frame format based on the wireless LAN standard, and the transmission processing unit 504 encodes and modulates the transmission data, and up-converts a baseband transmission signal based on the wireless LAN standard. Then, the antenna control unit 505 transmits the signal as a wireless signal from one or more antenna elements (not illustrated). Further, the antenna control unit 505 also receives a wireless signal from an antenna element. The reception processing unit 507 down-converts a wireless signal received via the antenna element and then demodulates and decodes the wireless signal. The reception frame analyzing unit 508 extracts predetermined data from the decoded signal and analyzes the described information or the like. The receiving buffer 509 stores the received data.

The access control unit 506 implements the above-described transmission/reception control through an access control procedure based on the wireless LAN standard. At the time of reception, when a notification indicating the signal within the same BSS (or the same ESS) is received from a PLCP header analyzing unit 513, the access control unit 506 recognizes the signal as a reception frame, regards that there is no reception when it is a frame notified as a signal from the OBSS (or another ESS), and it is a predetermined received field strength or less, and starts a next channel access. Further, the access control unit 506 may make a difference in a detection level of the received field strength between the signal of the BSS (or the same ESS) of its own device and the signal from the OBSS (or another ESS).

Further, in the illustrated wireless communication module 401, the Color information control unit 510, the Color information storage unit 511, the PLCP header constructing unit 512, and the PLCP header analyzing unit 513 are functional modules that perform characteristic processes in implementing the technology disclosed in this specification.

The Color information control unit 510 is configured to store the BSS Color information set to identify the signal of the BSS of its own device in the Color information storage unit 511 and perform control such that a predetermined operation is performed when a signal of the PLCP header to which the BSS Color information is added is detected.

For example, in the case of the wireless communication device 400 operating as the AP connected to the ESS, the Color information control unit 510 performs processes such as setting of the BSS Color information of its own device, setting of the ESS Color mask information, and an instruction to store the information in the PLCP header (that is, notify of the information).

Further, in the case of the wireless communication device 400 operating as the STA subordinate to the AP connected to the ESS, the Color information control unit 510 performs processes such as management of the BSS Color information or the ESS Color mask information notified of from an associated AP and determination of whether or not the BSS Color information extracted from the PLCP header of the reception frame is used within the same ESS. As a characteristic configuration for implementing the technology disclosed in this specification, if the BSS Color information from other APs belonging to the ESS is detected on the basis of the BSS Color information and the ESS Color mask information stored in the Color information storage unit 511, the Color information control unit 510 gives a notification indicating the detection to the PLCP header analyzing unit 513.

The Color information storage unit 511 stores the BSS Color information and the ESS Color mask information. For example, in the case of a wireless communication device 400 operating as the AP connected to the ESS, when the parameter such as the BSS Color information set by another AP grouped by the same ESSID (or the same SSID) is received from another AP, the Color information storage unit 511 stores the parameter as the BSS Color information used in the ESS. Further, the Color information storage unit 511 stores the ESS Color mask information set on the basis of the BSS Color information used in the ESS in the Color information control unit 510. Further, in the case of the wireless communication device 400 operating as the STA subordinate to the AP connected to the ESS, the Color information storage unit 511 stores the BSS Color information of its own device or the ESS Color mask information notified of from the AP.

The PLCP header constructing unit 512 constructs the PLCP header to be added to the transmission frame. In the present embodiment, the PLCP header constructing unit 512 is configured to acquire the parameter such as the BSS Color information of its own device from the Color information control unit 510, construct the PLCP header in which the BSS Color information is described, and add the PLCP header as predetermined header information to the data frame or the like.

The PLCP header analyzing unit 513 analyzes the PLCP header added to the reception frame. Further, the PLCP header analyzing unit 513 recognizes the reception frame on the basis of the BSS Color information stored in the PLCP header, and notifies the access control unit 506 of implementation of predetermined access control. In the present embodiment, the PLCP header analyzing unit 513 determines that, in addition to the signal in which the same BSS Color information as its own device is described in the PLCP header, the signal in which the BSS Color information specified to be used in the same ESS from the ESS Color mask information is described is the signal from the same BSS (or the signal within the same ESS), determines that the other signals are the signals from the OBSS, and notifies the access control unit 506 of the determination. The determining of whether or not it is the same transmitted from another AP within the ESS by the PLCP header analyzing unit 513 is a characteristic configuration in implementing the technology disclosed in this specification.

Figure 6A:
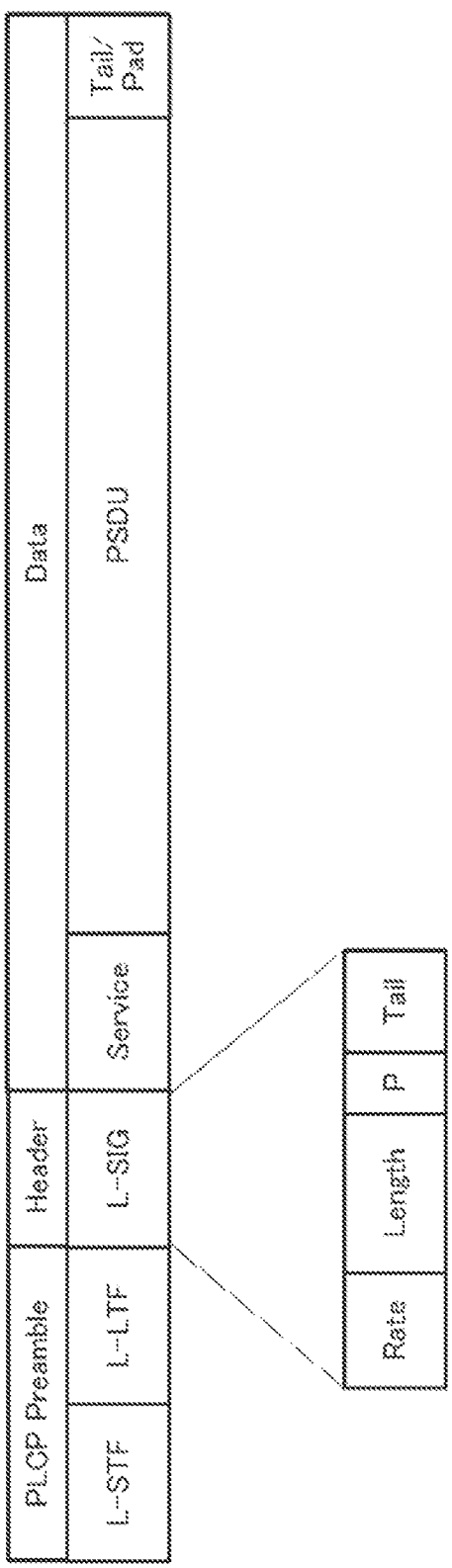
FIGS. 6A and 6B are diagrams illustrating a frame configuration of a wireless LAN system of a related art (IEEE 802.11a/b/g and IEEE 802.11n).
Figure 6B:
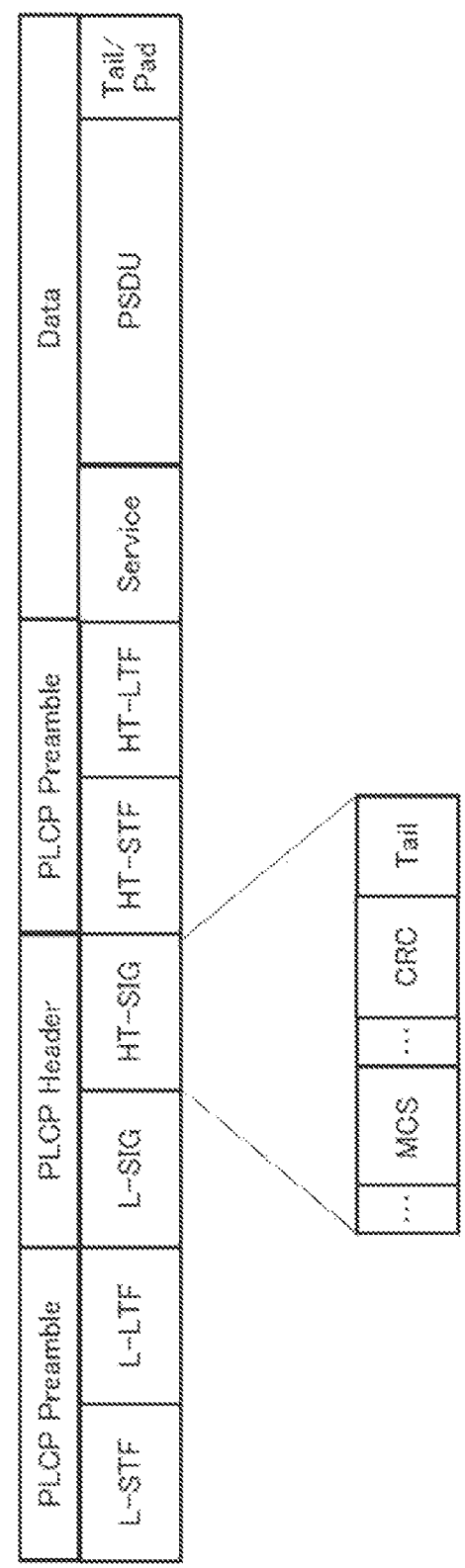

FIGS. 6A and 6B illustrate a frame configuration of a wireless LAN system of a related art.

FIG. 6A illustrates a frame structure used in the IEEE 802.11a/b/g standard. In the illustrated frame structure, as a PLCP preamble and a header, PLCP header information including a legacy signal (L-SIG) is added to a PLCP preamble including legacy short training (L-STF) and legacy long training (L-LTF). Further, a data portion includes a service (Service) of a header, a service data unit (PSDU), a tail bit (Tail), and as-needed padding (Pad). Further, in the L-SIG of the PLCP header is configured such that a parity (P), and a tail bit (Tail) are added to rate information (Rate) storing a modulation scheme and a coding rate information of the data portion and length information (Length) indicating an information length of a frame.

Further, FIG. 6B illustrates a high throughput (HT) mixed frame structure used in the IEEE 802.11n standard. In the illustrated frame structure, as a PLCP preamble and a header, PLCP header information of a legacy signal (L-SIG) is added to a PLCP preamble including legacy short training (L-STF) and legacy long training (L-LTF), and compatibility with the PLCP preamble and the header of the scheme of a related art illustrated in FIG. 6A is kept.

Here, in the mixed frame structure, a high throughput signal (HT-SIG), high throughput short training (HT-STF) serving as a preamble, and high throughput long training (HT-LTF) are added following the PLCP header.

Further, a data portion of the mixed frame structure includes a service (Service) of a header, a service data unit (PSDU), a tail bit (Tail), and as-needed padding (Pad). Further, the HT-SIG of the PLCP header includes information such as scheme information (MCS) of a modulation scheme or a coding rate of the data portion, and an error detection code (CRC) and a tail bit (Tail) are added thereto.

Figure 7:
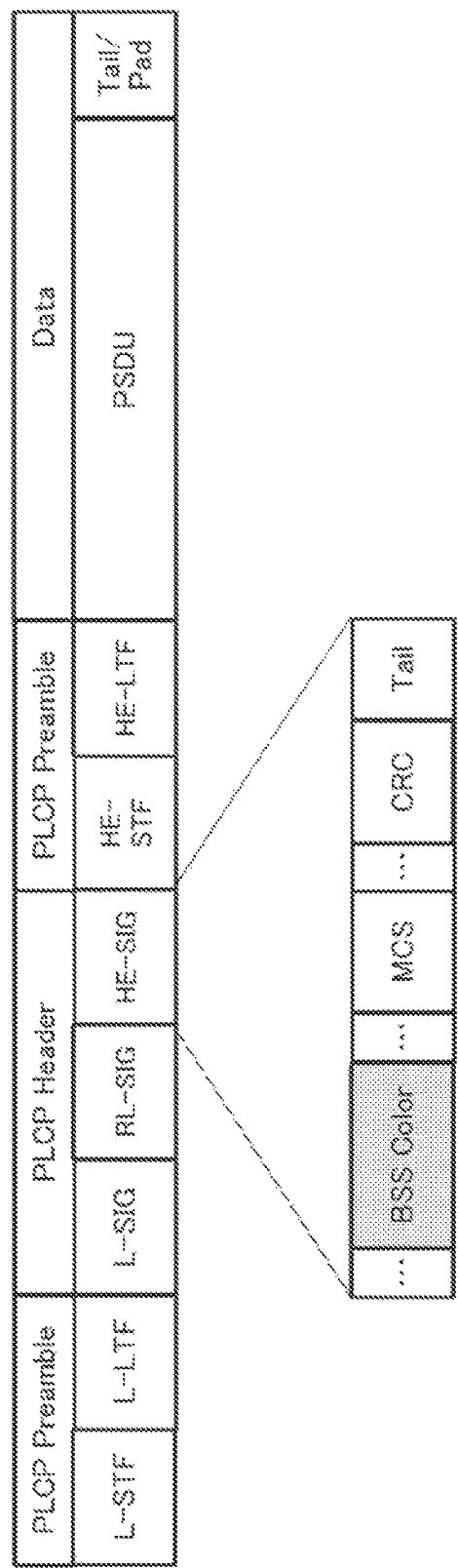
FIG. 7 is a diagram illustrating a frame configuration of a wireless LAN system which is currently in a standardization process.

FIG. 7 illustrates a frame configuration of a high-efficiency wireless LAN system which is currently in a standardization process. In the frame structure illustrated, the PLCP preamble includes legacy short training (L-STF) and legacy long training (L-LTF), and a legacy signal (L-SIG)

and a signal (RL-SIG) in which the legacy signal is repeated are added thereto as the PLCP header information.

Following the PLCP preamble and the header, the PLCP header of the high-efficiency signal (HE-SIG), high efficiency short training (HE-STF), and high efficiency long training (HE-LTF) are added. Further, the data portion includes a service data unit (PSDU), a tail bit (Tail), and as-needed padding (Pad).

Further, the HE-SIG includes the BSS Color information (BSS Color) and information including scheme information (MCS) such as a modulation scheme or a coding rate of the data portion, and an error detection code (CRC) and a tail bit (Tail) are added thereto. The BSS Color information is short information having about a 6-bit length for identifying each BSS in the upper-level ESS including the BSS to which its own device belongs and is set to a value not overlapping with other BSSs in the ESS.

Figure 8:
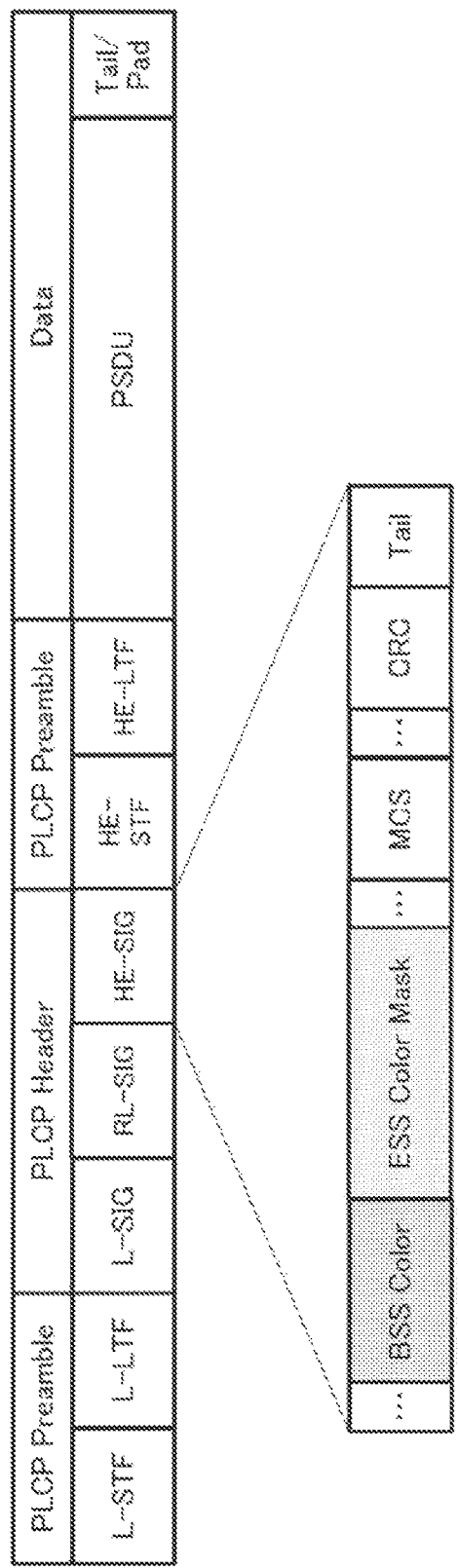
FIG. 8 is a diagram illustrating a frame configuration of a wireless LAN system proposed in this specification.

FIG. 8 illustrates a frame configuration of the wireless LAN system proposed in this specification. Description of a basic frame configuration similar to the frame configuration illustrated in FIG. 7 is omitted. It should be noted that high-efficiency signals (HE-SIG) include the ESS Color mask information (ESS Color Mask) for specifying the BSS Color information in addition to the BSS Color information.

The ESS Color mask information is information expressing the BSS Color information of other APs set in the same ESS as the bit mask for the BSS Color information of its own device indicated by the bitmap format. The ESS Color mask information can designate a plurality of pieces of BSS Color information even with the short information having the same bit length as the BSS Color information.

By using the frame structure illustrated in FIG. 8, the AP notifies of the BSS Color information of its own device and the ESS Color mask information together, and thus it is possible to notify of all pieces of BSS Color information to be managed with the short information without notifying of the bitmaps of all pieces of BSS Color information.

Further, the STA which has received the frame having the structure illustrated in FIG. 8 can easily identify the BSS Color information used by the ESS and the BSS Color information used by the OBSS not belonging to the ESS on the basis of the BSS Color information of the AP of its own device and the ESS Color mask information. Accordingly, the STA can detect whether or not the BSS Color information included in the same ESS is described only with the received frame without acquiring information such as the ESSID from the AP in advance. Further, the STA can distinguish the frame from other BSSs belonging to the ESS and the frame from the OBSS not belonging to the ESS simply by decoding the PLCP header and does not need to decode all unnecessary frames.

FIG. 9 illustrates a configuration example of an extended service set Color information element as a modified example of FIG. 8.

The illustrated extended service set Color information element includes an identifier (Element ID) identifying a type of the information element, an information length (Length) of the information element, the BSS Color information (BSS Color) of the AP, the MAC address (BSSID) of the AP, the ESS Color mask information (ESS Color Mask) used in the ESS according to the present embodiment, and an identifier (ESSID) grouped as the ESS, and is configured with information in which parameters used in common in the ESS if necessary are further added in addition to these parameters.

The illustrated information element is information for individually notifying of the parameters of the ESS including information of the AP connected as the ESS and the BSS Color information used by the AP which is stored in a management frame, an action frame, or the like exchanged between devices from the AP to the STA in a case where the STA enters or recognizes a certain AP. Alternatively, the AP may also store such information element in a beacon frame and notify each the STA subordinate thereto of the information.

In other words, the STA exchanges the parameters of the ESS with the AP in advance (before the frame transmission is performed) through the illustrated information element so that the BSS Color information used by the ESS and the BSS Color information used in the OBSS can be distinguished thereafter.

By receiving the extended service set Color information element from the AP, thereafter, the STA belonging to the AP can detect the BSS Color information to be used by other APs or STAs connected as the same ESS and all pieces of BSS Color information to be used in the ESS.

Further, the parameters of the ESS are exchanged between the AP and the STA in advance (before the frame transmission is performed) using the information element illustrated in FIG. 9, and thus even in a case where the frame in which no ESS Color mask information is stored in the PLCP header (see FIG. 7) is received, the STA can detect all pieces of BSS Color information to be used in the ESS by masking the BSS Color information stored in the PLCP header with the ESS Color mask information acquired in advance. In other words, the ESS Color mask information is not necessarily stored in the HE-SIG as illustrated in FIG. 8 in each frame.

Figure 10:
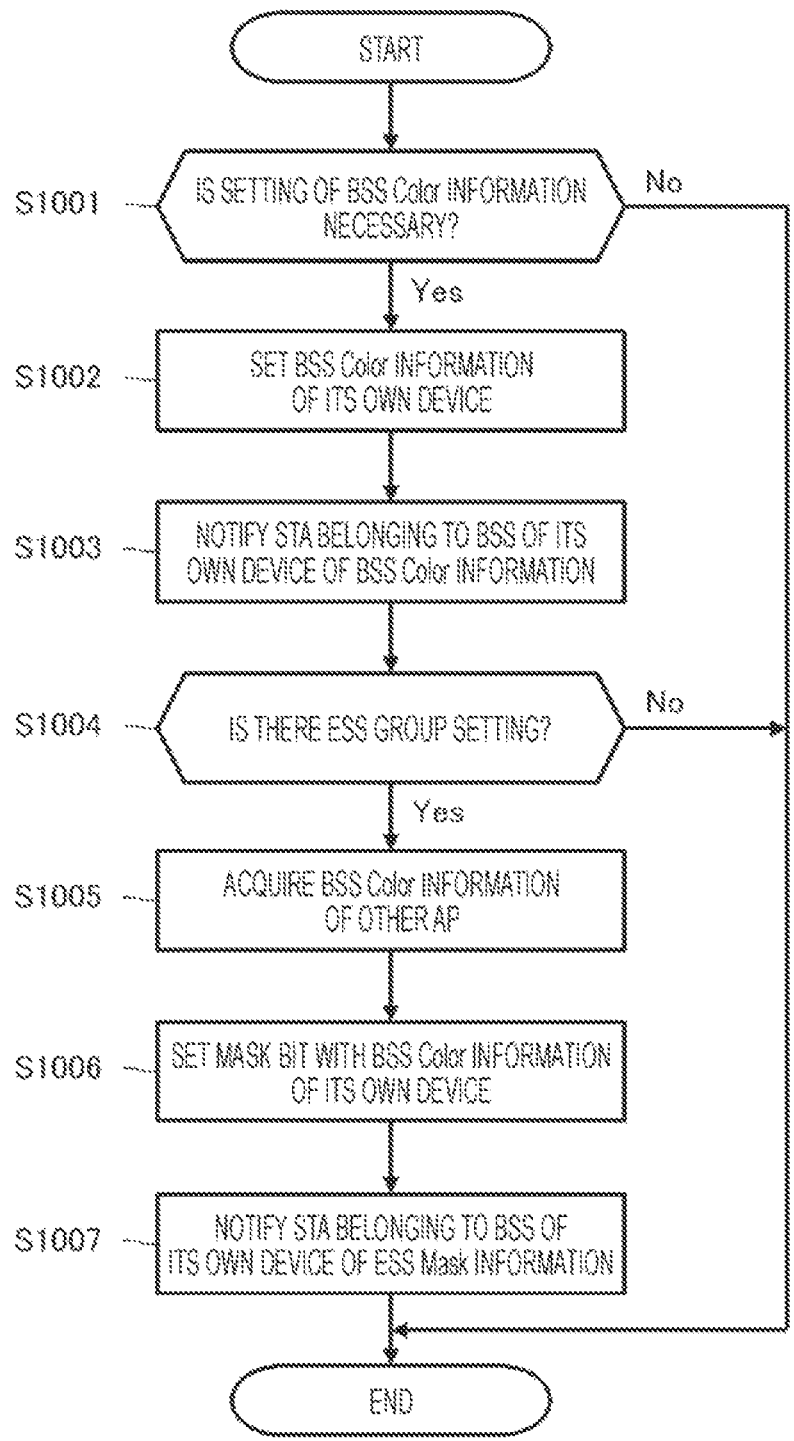
FIG. 10 is a flowchart illustrating a processing procedure for setting ESS Color mask information in a communication device operating as an AP.

FIG. 10 illustrates a processing procedure in which the communication device operating as the AP sets the ESS Color mask information and notifies of the ESS Color mask information in the wireless LAN network to which the technology disclosed in this specification is applied using a flowchart form. In the illustrated processing procedure, it is basically assumed that the wireless communication device 400 illustrated in FIGS. 4 and 5 operates as the AP.

In a case where it is determined that the setting of the BSS Color information is necessary (Yes in step S1001), the AP updates the value of the BSS Color information which is not used in the ESS near its own device or the ESS to which its own device is connected as the BSS Color information to be used in the BSS of its own device (step S1002). As an event in which the setting of the BSS Color information is necessary, various events such as, when the AP newly establishes a connection to the ESS or when a configuration of the BSS in the ESS fluctuates are considered. Further, a specific method in which the AP sets the BSS Color information of its own device is arbitrary.

Then, the AP notifies the STA registered in the AP of its own device of the value of the BSS Color information set in step S1002 (S1003). As a method of notifying of the BSS Color information, there are a method of storing the ESS Color mask information in the PLCP header of the transmission frame together with the BSS Color information of its own device (see FIG. 8) and a method of storing the BSS Color information in the information element (see FIG. 9) included in the management frame, the action frame, the beacon frame, or the like and notifying of the BSS Color information.

Further, if the ESSID to which its own device belongs is set (Yes in S1004), the AP individually acquires the BSS Color information used by other APs connected to the same ESS from the server managing the ESS or other APs (Step S1005), and sets the ESS Color mask information for specifying the BSS Color information used in the same ESS (step S1006). The bitmap indicating the BSS Color information of other APs set in the same ESS as the bit mask for the BSS Color information of its own device indicated by the bitmap format is set in the ESS Color mask information.

Then, the AP notifies the STA registered in (subordinate to) its own device of the ESS Color mask information set in step S1006 (step S1007), and ends the process routine. As the method of notifying the ESS Color mask information, there are a method of storing the ESS Color mask information in the PLCP header of the transmission frame together with the BSS Color information of its own device (see FIG. 8) and a method of storing the ESS Color mask information in the information element (see FIG. 9) included in the management frame, the action frame, the beacon frame, or the like alone (that is, without accompanying the BSS Color information) and notifying of the ESS Color mask information.

On the other hand, in a case where the BSS Color information is not set (No in step S1001) or in a case where the ESS group is not set (No in step S1004), the AP does not perform a series of processes described above and ends the process routine.

Figure 11:
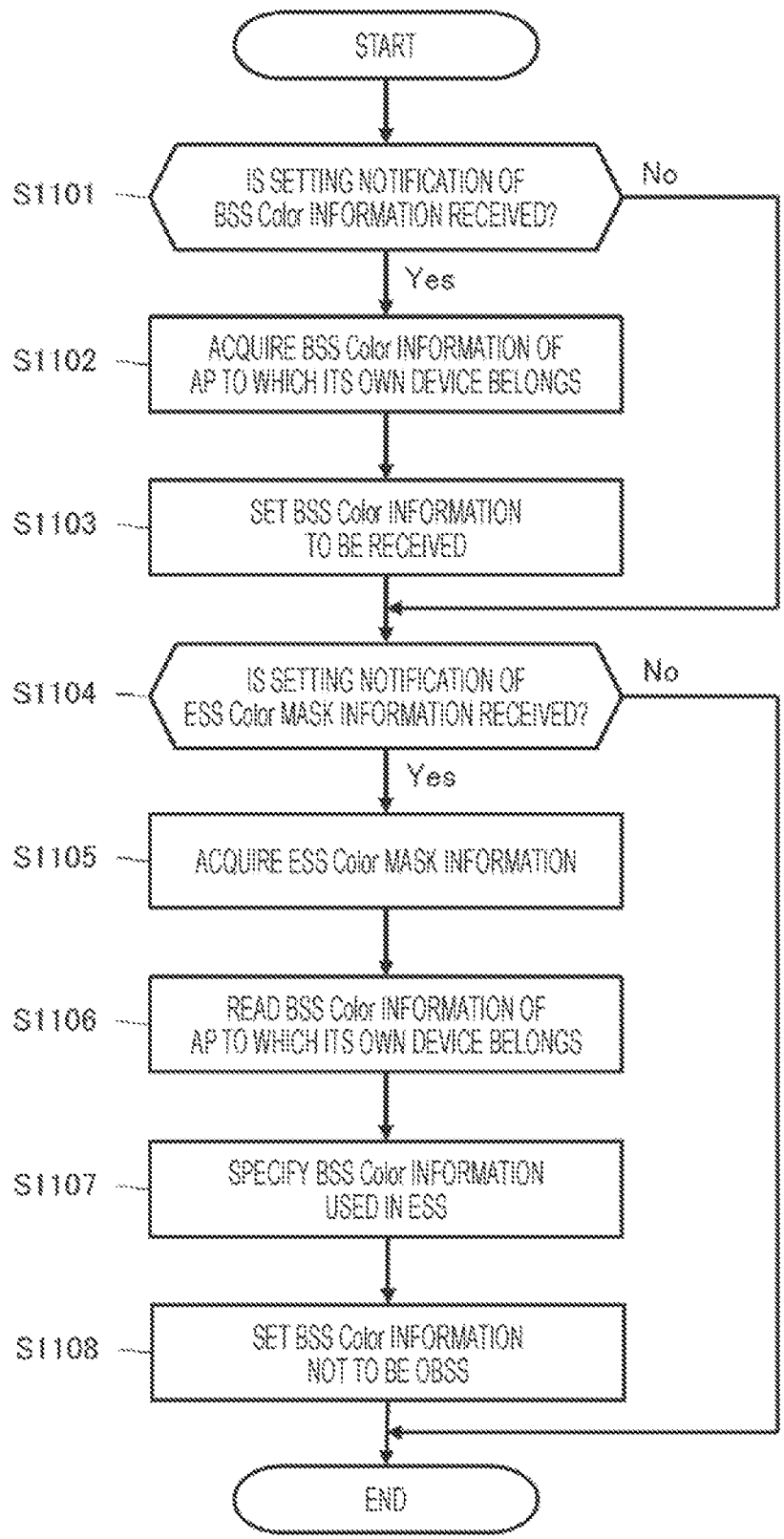
FIG. 11 is a flowchart illustrating a processing procedure for specifying BSS Color information used in an ESS in a communication device operating as an STA.

FIG. 11 illustrates a processing procedure in which the communication device operating as the STA specifies the BSS Color information used in the same ESS in the wireless LAN network to which the technology disclosed in this specification is applied using a flowchart form. In the illustrated processing procedure, it is basically assumed that the wireless communication device 400 illustrated in FIGS. 4 and 5 operates as the STA.

Upon receiving the notification of the BSS Color information set by the AP to which its own device belongs (step S1101), the STA acquires the BSS Color information described in the notification (step S1102), and registers the BSS Color information used in the BSS to which its own device belongs in the Color information storage unit 511 as the BSS Color information to be received (Step S1103).

For example, the notification from the AP is performed using the method of storing it in the PLCP header of the frame (see FIG. 8) or the information element (see FIG. 9) included in the management frame, the action frame, the beacon frame, or the like. The PLCP header analyzing unit 513 extracts the BSS Color information of its own device from the PLCP header, and the Color information control unit 510 stores the BSS Color information in the Color information storage unit 511.

Further, upon receiving the setting notification of the ESS Color mask information from the AP to which its own device belongs (Yes in step S1104), the STA acquires the ESS Color mask information (step S1105).

For example, the ESS Color mask information is notified of from the AP using the method of storing the ESS Color mask information in the PLCP header of the frame (see FIG. 8) or the method of storing the ESS Color mask information in the information element (see FIG. 9) included in the management frame, the action frame, the beacon frame, or the like, which is transmitted in advanced.

Then, in the STA, the Color information control unit 510 reads the BSS Color information of the BSS of its own device from the Color information storage unit 511 (step S1106), and specifies the BSS Color information used in the same ESS from the bitmap information masked with the ESS Color mask information acquired in the step S1105 (step S1107). Then, the Color information control unit 510 registers the specified BSS Color information in the Color information storage unit 511, notifies the PLCP header analyzing unit 513 of the specified BSS Color information not to be the BSS Color information of the OBSS (step S1108).

Further, in the processing procedure illustrated in FIG. 11, even when the setting of the BSS Color information at a preceding stage and the setting of the ESS Color mask information at a subsequent stage arrive at different timings, the STA is configured to be able to process them in accordance with the notification method from the AP or the like.

Figure 12:
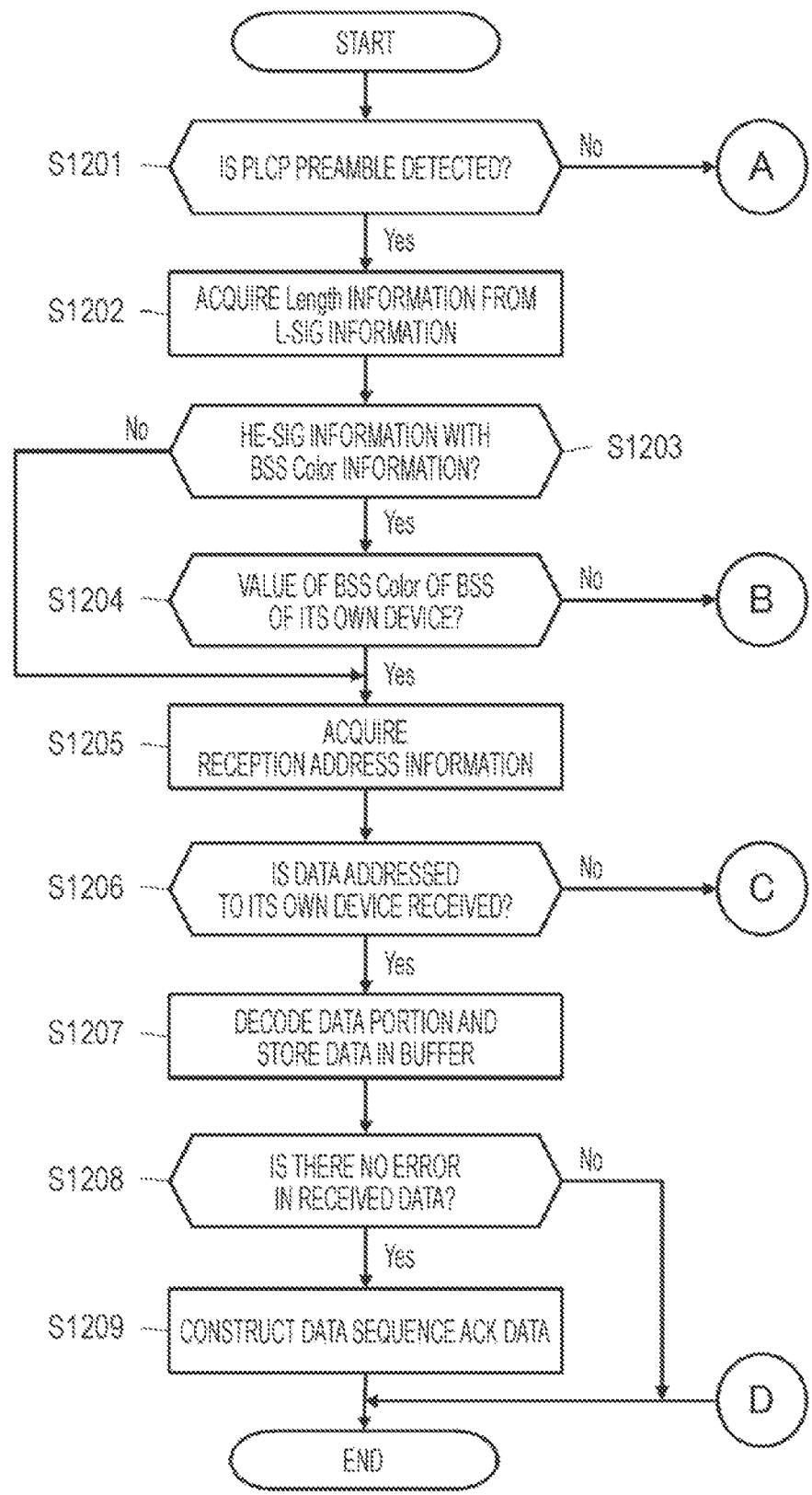
FIG. 12 is a flowchart illustrating a processing procedure executed when a frame is received in a communication device operating as an AP or an STA.
Figure 13:
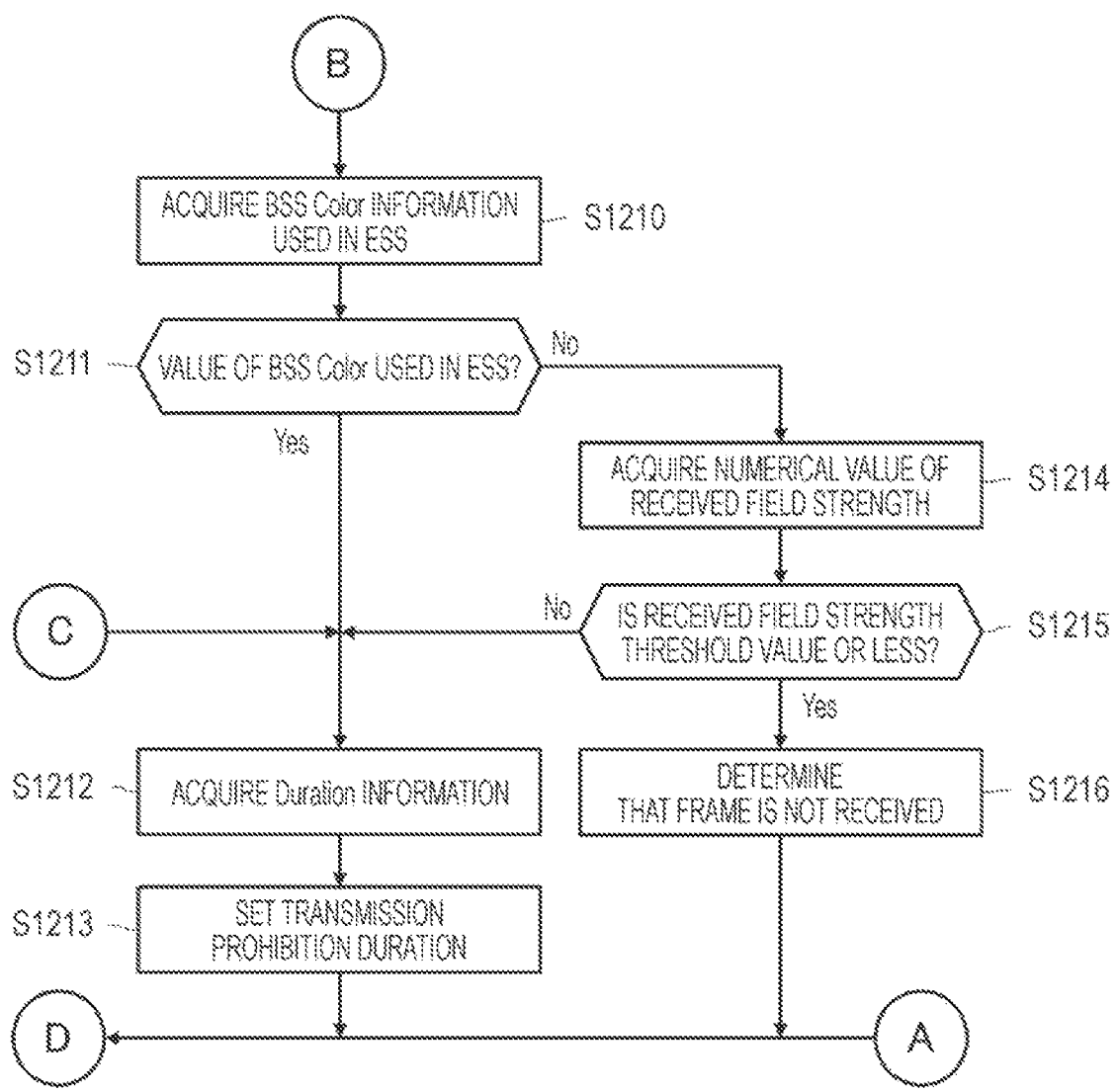
FIG. 13 is a flowchart illustrating a processing procedure executed when a frame is received in a communication device operating as an AP or an STA.

FIGS. 12 and 13 illustrate a processing procedure executed in a case where the communication device operating as the AP or the STA receives the frame in the wireless LAN network to which the technology disclosed in this specification is applied using flowchart forms. The illustrated processing procedure is assumed to be basically performed by the wireless communication device 400 illustrated in FIGS. 4 and 5.

First, when the communication device detects the PLCP preamble as a predetermined synchronization signal (Yes in step S1201), the PLCP header analyzing unit 513 acquires the information length (Length) information of the frame from the information described in the L-SIG (step S1202).

Here, if the PLCP header of the received frame includes the HE-SIG with the BSS Color information (Yes in step S1203), the Color information control unit 510 determines whether or not the value described in the BSS Color field is the value of the BSS Color of the BSS of its own device (step S1204).

Then, in a case where the BSS Color information included in the HE-SIG is the BSS Color information of its own device (Yes in step S1204) or in a case where a frame having no setting of the BSS Color information is received (No in step S1203), the reception processing unit 507 decodes the PLCP preamble of the reception frame and the data portion after the header, and when the reception address information is acquired from the MAC header of the reception frame (step S1205), the reception frame analyzing unit 508 determines whether or not it is reception of data addressed to its own device in which the address of its own device is described (step S1206).

Here, if it is the reception of the data addressed to its own device in which the address of its own device is described (Yes in step S1206), the data portion extracted by the reception frame analyzing unit 508 is stored in the receiving buffer 509 (step S1207). Further, if there is no error in the received data (Yes in step S1208), a sequence number of the data is constructed as ACK data in the transmission frame constructing unit 503 (step S1209) and transmitted to a transmission source of the reception frame if necessary. Here, in a case where there is an error in the received data (No in step S1208), the construction of the ACK data is skipped, and the process routine ends.

If it is not the reception of the data addressed to its own device in which the address of its own device is described (No in step S1206), the reception frame analyzing unit 508 acquires Duration information from the MAC header of the reception frame (step S1212), and the access control unit 506 sets it as a transmission prohibition duration from its own device over a period of time related to the information length of the frame (step S1213).

Further, in a case where it is determined that the BSS Color information included in the HE-SIG of the received frame is not the BSS Color information of its own device (No in step S1204), the Color information control unit 510 acquires the BSS Color information in the same ESS from the Color information storage unit 511 (step S1210), compares it with the BSS Color information of the reception frame, and further determines whether or not it is the value of the BSS Color information used in the same ESS (step S1211).

The process of steps S1210 to S1211 may be performed on the basis of the BSS Color information from another AP belonging to the ESS notified of from the Color information control unit 510 by the PLCP header analyzing unit 513.

Alternatively, the processes of steps S1210 to S1211 may be a process in which the PLCP header analyzing unit 513 extracts the BSS Color information and the ESS Color mask information from the PLCP header of the reception frame, masks the BSS Color information with the ESS Color mask information, specifies the BSS Color information used in the ESS to which the frame transmission source belongs, and determines whether or not the BSS Color information of its own device is included therein.

Here, in a case where it is found that the BSS Color information described in the HE-SIG of the reception frame is the value of any BSS Color information used in the same ESS (Yes in step S1211), it is regarded as the frame addressed to another communication device of the BSS to which its own device belongs. In this case, the signals from other BSSs within the same ESS are assumed to be dealt in accordance with the signals of the BSS of its own device. In other words, the reception frame analyzing unit 508 acquires the Duration information from the MAC header of the reception frame (step S1212), and sets it as the transmission prohibition duration from its own device over the period of time related to the information length of the frame in the access control unit 506 (Step S1213).

Further, in a case where it is determined that the BSS Color information described in the HE-SIG of the reception frame does not coincide with the value of any BSS Color information used in the same ESS (No in step S1211), the received frame is regarded as the signal from the OBSS of the different ESS. In this case, the access control unit 506 acquires a numerical value of the received field strength (step S1214), and further determines whether or not it has a level of a predetermined threshold value or less (step S1215). Further, the access control unit 506 may set a threshold value higher than the signal of its own device BSS in the signal from the OBSS.

Further, in a case where the received field strength of the signal from the OBSS of the different ESS has the level of the threshold value or less (Yes in step S1215), the access control unit 506 determines that the frame is not recognized (step S1216). In this case, the access control unit 506 does not set the transmission prohibition duration from its own device, and ends the process routine. Thus, the communication device can start the frame transmission towards another communication device in the same BSS.

In a case where the received field strength has the level of the threshold value or more (No in step S1215), the reception frame analyzing unit 508 acquires the Duration information from the MAC header of the reception frame (step S1212), and the access control unit 506 sets it as the transmission prohibition duration from its own device over the period of time related to the information length of the frame (step S1213). Further, the Duration information described above may be set in advance from the Rate information and the Length information of the PLCP header.

As described above, according to the technology disclosed in this specification, the AP notifies of the BSS Color information of its own device together with the information specifying the BSS Color information to be managed. The BSS Color information to be managed here corresponds to the BSS Color information used by other BSSs in the same ESS. Therefore, by receiving the notification, the STA subordinate to the AP can easily identify the BSS Color information used by the same ESS and the BSS Color information used by the OBSS not belonging to the ESS.

Further, the information specifying the BSS Color information to be managed is the ESS Color mask information expressed as the mask for the BSS Color information of its own device (specifically, the bit mask for the BSS Color information indicated by the bitmap format). The ESS Color mask information has the same bit length as the BSS Color information, and all pieces of BSS Color information does not need to be necessarily described, and thus there is an advantage in that it is possible to notify of a plurality of pieces of BSS Color information with the short information.

In a case where the technology disclosed in this specification is applied to, for example, the IEEE 802.11ax standard, the communication device such as the AP can store the ESS Color mask information in the PLCP header together with the BSS Color information and notify the STA of it. Further, the communication device such as the STA can identify the BSS Color information used by the same ESS and the BSS Color information used by the OBSS not belonging to the same ESS from the BSS Color information described in the PLCP header of the reception frame and deal with the signals from other BSSs in the same ESS in accordance with the signals from the BSS of its own device.

INDUSTRIAL APPLICABILITY

The technology disclosed in this specification has been described in detail with reference to the specific embodiment. However, it is obvious that those skilled in the art can make modifications or substitutions of the embodiment without departing from the gist of the technology disclosed in this specification.

The technology disclosed in this specification can be suitably applied to, for example, a wireless LAN system conforming to the IEEE801.11ax standard. Further, the technology disclosed in this specification can also be applied to networks based on various wireless standards in which an upper-level ESS is constituted by a plurality of BSSs, and transmission and reception of signals including information identifying the BSS are performed.

In short, the technology disclosed in this specification has been described by way of example, and the content of this specification should not be interpreted to be limited. In order to determine the gist of the technology disclosed in this specification, claims set forth below should be taken into consideration.

Further, the technology disclosed in this specification may have the following configurations.

(1) A communication device that notifies of first information identifying a BSS of the communication device and second information capable of specifying another BSS included in the same ESS.

(2) The communication device according to (1), in which BSS Color information of the communication device is notified of as the first information, and the second information capable of specifying the BSS Color information set in another access point included in the same ESS is notified of.

(3) The communication device according to (2), in which the second information capable of specifying the BSS Color information set in another access point included in the same ESS is notified of on the basis of the BSS Color information of the communication device.

(4) The communication device according to (2) or (3), in which ESS Color mask information expressing the BSS Color information of another access point set in the same ESS by a format of a bit mask for a bitmap indicating the BSS Color information of the communication device is notified of as the second information.

(5) The communication device according to any one of (1) to (4), in which the first information and the second information are stored in a physical header and notified of.

(6) The communication device according to any one of (1) to (5), in which the second information is stored in an information element included in a predetermined frame and notified of.

(7) A communication method including a step of notifying of first information identifying a BSS of an own device and second information capable of specifying another BSS included in the same ESS.

(8) A communication device that manages first information identifying a BSS of the communication device and second information capable of specifying another BSS included in the same ESS and identifies whether a reception signal is a signal of the same ESS or a signal from another ESS, using the second information.

(9) The communication device according to (8), in which the first information is BSS Color information, and the second information is information capable of specifying the BSS Color information set in another access point included in the same ESS, and the reception signal including the first information is identified on the basis of the BSS Color information specified using the second information.

(10) The communication device according to (9), in which the second information is information capable of specifying the BSS Color information set in another access point included in the same ESS on the basis of the BSS Color information, and the reception signal including the first information is identified on the basis of the BSS Color information specified from the first information using the second information.

(11) The communication device according to (9) or (10), in which the second information is ESS Color mask information expressing the BSS Color information of another access point set in the same ESS by a format of a bit mask for a bitmap indicating the BSS Color information of the communication device.

(12) The communication device according to any one of (8) to (11), in which a signal in which the first information and the second information are stored in a physical header is received.

(13) The communication device according to any one of (8) to (11), in which a predetermined frame including an information element storing the second information is received.

(14) The communication device according to any one of (8) to (13), in which the reception signal identified as the same ESS is dealt with, in accordance with a signal of the BSS of the communication device.

(15) The communication device according to any one of (8) to (14), in which the reception signal is identified in accordance with whether or not the first information included in the reception signal is able to be identified from the second information to be managed.

(16) The communication device according to any one of (8) to (14), in which the reception signal is identified in accordance with whether or not the first information to be managed is able to be identified from the second information included in the reception signal.

(17) The communication device according to any one of (8) to (13), in which the frame is dealt not to be received in accordance with a received field strength of the reception signal identified as another ESS.

(18) A communication method including:

a step of managing first information identifying a BSS of an own device and second information capable of specifying another BSS included in the same ESS; and a step of identifying whether a reception signal is a signal of the same ESS or a signal from another ESS, using the second information.

REFERENCE SIGNS LIST

400 Wireless communication device
401 Wireless communication module
402 Information input module
403 Device control unit
404 Information output module
405 External connection module
501 Interface
502 Transmitting buffer
503 Transmission frame constructing unit
504 Transmission processing unit
505 Antenna control unit
506 Access control unit
507 Reception processing unit
508 Reception frame analyzing unit
509 Receiving buffer
510 BSS Color information control unit
511 Color information storage unit
512 PLCP header constructing unit
513 PLCP header analyzing unit

The invention claimed is:

1. A communication device, comprising:
circuitry configured to:
receive a signal that comprises first information and second information, wherein
the first information and the second information are in a physical header of the received signal,
the first information identifies first Basic Service Set (BSS) Color information of a first network,
the second information identifies second BSS Color information of a second network,
the communication device belongs to the first network, and
the first network and the second network belong to a first Extended Service Set (ESS); and
identify the received signal is a signal from the first ESS or a signal from a second ESS based on the second information, wherein the second ESS is different from the first ESS.

2. The communication device according to claim 1, wherein
the second information is based on the first BSS Color information, and
the circuitry is further configured to identify the received signal based on the first BSS Color information.

3. The communication device according to claim 1, wherein
the second information is ESS Color mask information that expresses the second BSS Color information by a format of a bit mask for a bitmap, and
the bitmap indicates the second BSS Color information.

4. The communication device according to claim 1, wherein
the circuitry is further configured to receive a frame that comprises an information element, and
the information element stores the second information.

5. The communication device according to claim 1, wherein
  the circuitry is further configured to execute an operation on the received signal based on the signal from the first ESS, and
  the received signal is identified as the signal from the first ESS.

6. The communication device according to claim 1, wherein the circuitry is further configured to identify the received signal based on the first information.

7. The communication device according to claim 1, wherein the circuitry is further configured to identify the received signal as the signal from the second ESS based on a field strength of the received signal.

8. A communication method, comprising:
  in a communication device:
    receiving a signal that comprises first information and second information, wherein
      the first information and the second information are in a physical header of the received signal,
      the first information identifies first Basic Service Set (BSS) Color information of a first network,
      the second information identifies second BSS Color information of a second network,
      the communication device belongs to the first network, and
      the first network and the second network belong to a first Extended Service Set (ESS); and
    identifying the received signal is a signal from the first ESS or a signal from a second ESS based on the second information wherein the second ESS is different from the first ESS.

* * * * *